P. Sylla.
Mower.
No. 12745 Patented April 17, 1855
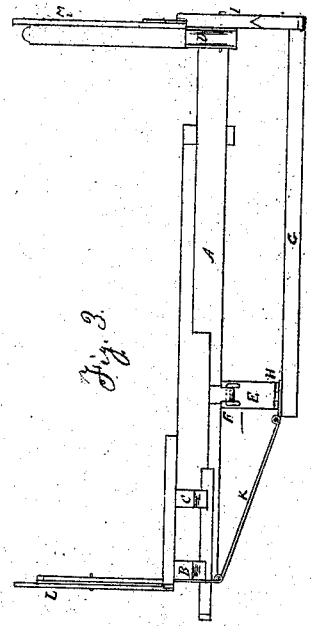
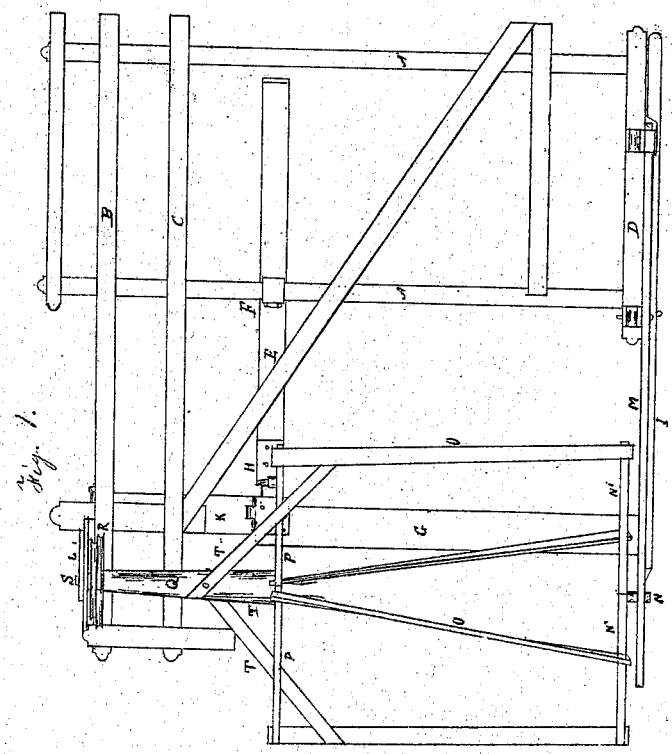
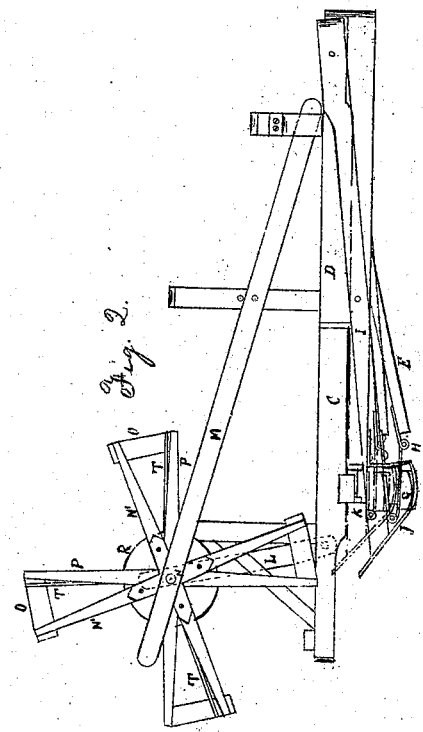

UNITED STATES PATENT OFFICE.

PHILO SYLLA, OF ELGIN, ILLINOIS.

IMPROVEMENT IN GRAIN AND GRASS HARVESTERS.

Specification forming part of Letters Patent No. 12,745, dated April 17, 1855.

*To all whom it may concern:*

Be it known that I, PHILO SYLLA, of Elgin, in the county of Kane and State of Illinois, have invented certain new and useful Improvements in Grain and Grass Harvesters; and I do hereby declare that the same are described and represented in the following specification and drawings.

To enable others skilled in the art to make and use my improvements, I will proceed to describe their construction and use, referring to the drawings, in which the same letters indicate like parts in each of the figures.

Figure 1 is a plan of such parts of a machine as are necessary to show my improvements. Fig. 2 is a side elevation; and Fig. 3 a front elevation, omitting the reel.

The nature of my invention consists in hanging the sickle-bar to the ends of the levers which carry it, so that it can be raised and lowered without inclining the guard-fingers, but carry them level or parallel with the ground, or at a proper or given inclination, and at such a height from the ground as may be desirable; also, in making the reel with a journal at each end and without a shaft through its center.

As the carriage and most of the machine is constructed similar to the machine which is described in a patent granted to me, in conjunction with Augustus Adams, on the 20th of September, 1853, No. 10,038, as fully appears on the records of the Patent Office, I shall only describe such parts as are necessary to a proper and full understanding of my improvements.

In the accompanying drawings, A A' are the cross-bars of the carriage, connected together by the rails B, C, and D, and such others as may be necessary or desirable, so as to form a proper frame, to which the other parts are either fastened or connected. The lever E is hinged to the cross-bar A at F, and the fore end of the lever is hinged to the rear edge of the sickle-bar G by the hinge H, as represented. The lever I vibrates on the pin $a$, which passes through it and the rail D. This lever I is connected near its fore end, on the under side, by the hinge J, to the front edge of the sickle-bar G, at the opposite corner diagonally from the hinge H, so that the sickle-bar may be raised or lowered without changing its position horizontally or inclining it materially, so that the guard-fingers, fastened to the bar G, enter the grain at the same angle, whether the sickle-bar is carried high or low, so as to leave the stubble long or short. This improved mode of hanging the sickle-bar so as to carry the guard-fingers always horizontal, or at such an inclination as may be desired, whether the sickle-bar is carried high or low, effectually remedies the defect heretofore existing in harvesting-machines, for if they were made so as to carry the guard-fingers horizontal when cutting close to the ground, if they were raised it elevated the points, so that the tendency was to slide over inclined or leaning grain without cutting it. Again, if the guard-fingers are arranged so as to stand horizontally when the sickle-bar is carried some distance from the ground, if it is depressed so as to cut close to the ground, the points of the fingers are very liable to run into the ground, especially if the ground is uneven. Both of the above-mentioned defects are completely obviated by my improved mode of hanging the sickle-bar. The sickle-bar G is connected to the rail B by the link K, which is hinged at each end to the bar and rail, and aids materially in holding the bar in a horizontal position and prevents it from being traversed by the sickle.

The supports of the reel-journals may be constructed like those represented at L and M or otherwise. The journal N is fastened to the arms N' N'. These arms are connected by the bars O O to the arms P P, which arms are fastened across the end of the short shaft Q, which is provided with a pulley, R, for the band to turn the reel, and a journal, S, fitted to the support L. As the shaft Q does not extend through the reel, the braces T T are fastened to the shaft Q, the arms P P, and the bars O O, as represented, to make it firm and strong enough for the purpose it is intended. This reel may be turned by a band from a pulley on the driving-wheel shaft or otherwise.

Reels constructed in my improved mode without a shaft extending through them are found to possess great advantages. In cutting leaning, lodged, or uneven grain with a reel which has a shaft through it the grain frequently gets wound around the shaft unless the reel is made very large, and when made large it takes a great deal of power to drive it, or far more power than if it is made small, particularly if it is propelled against the wind. Besides, in cutting where there are large weeds and one of the bars sweeps one down against the shaft of the reel, it frequently stops it; but when there is no shaft for it to come in contact with it slips out without stopping the reel or giving any further trouble.

The advantages of my improvements are:

First, a sickle cuts better in a horizontal position than any other.

Second, the sickle accommodates itself to the surface of the ground better.

Third, by making the reel without a shaft extending through it it can be made smaller, cheaper, lighter, and be operated with far less power.

What I claim as my invention, and desire to secure by Letters Patent, is—

1. Hanging the sickle-stock G to the ends of the levers E and I, which carry it, by means of the hinges H and J, or their equivalents, located at the diagonal corners of said stock, substantially as described, for the purposes set forth.

2. Making the reel with a journal at each end and without a shaft through its center, as described.

PHILO SYLLA.

Witnesses:
 JAMES BOLSTER,
 PAUL R. WRIGHT.